United States Patent [19]

Bowen et al.

[11] Patent Number: 5,076,688
[45] Date of Patent: Dec. 31, 1991

[54] OPTICAL SIMULATOR WITH LOOP-BACK ATTENUATOR HAVING METALIZED OPTICAL FIBER

[75] Inventors: Terry P. Bowen, Etters; Paul R. Reitz, Palmyra; William J. Stape, Harrisburg, all of Pa.

[73] Assignee: AMP Incorporated, Harrisburg, Pa.

[21] Appl. No.: 707,583

[22] Filed: May 30, 1991

Related U.S. Application Data

[62] Division of Ser. No. 498,072, Mar. 23, 1990, Pat. No. 5,039,456.

[51] Int. Cl.[5] .................. G02B 9/36; G01N 21/84
[52] U.S. Cl. .................. 356/73.1; 250/227.11; 385/53
[58] Field of Search .................. 356/73.1; 250/227.11

[56] References Cited

U.S. PATENT DOCUMENTS

| | | | |
|---|---|---|---|
| 4,669,820 | 6/1987 | Ten Berge | 350/96.20 |
| 4,881,793 | 11/1989 | Tarbox | 350/96.20 X |
| 4,952,798 | 8/1990 | Graham et al. | 356/73.1 X |
| 4,982,083 | 1/1991 | Graham et al. | 356/73.1 X |

*Primary Examiner*—Vincent P. McGraw

[57] ABSTRACT

An optical simulator 10, shaped to be interchangeable with a complimentary connector 7 that intermates with an optical connector housing 6 having an optical emitter 4 and an optical detector 5, comprises an alignment fixture with connectors for intermating with the optical emitter 4 and the optical detector 5. Included is an optical fiber 11 formed in a loop and installed within the alignment fixture 12 with a first end face 15 of the loop 11 aligned with the emitter 4 and a second end face 16 of the loop 11 aligned with the detector 5 of the optical connector 6. The simulator 10 is a solid molded body of an electrically insulating material. The optical fiber formed in a loop 11 further comprises an optical fiber having a rigid thin coating of electroplated metal 14.

9 Claims, 2 Drawing Sheets

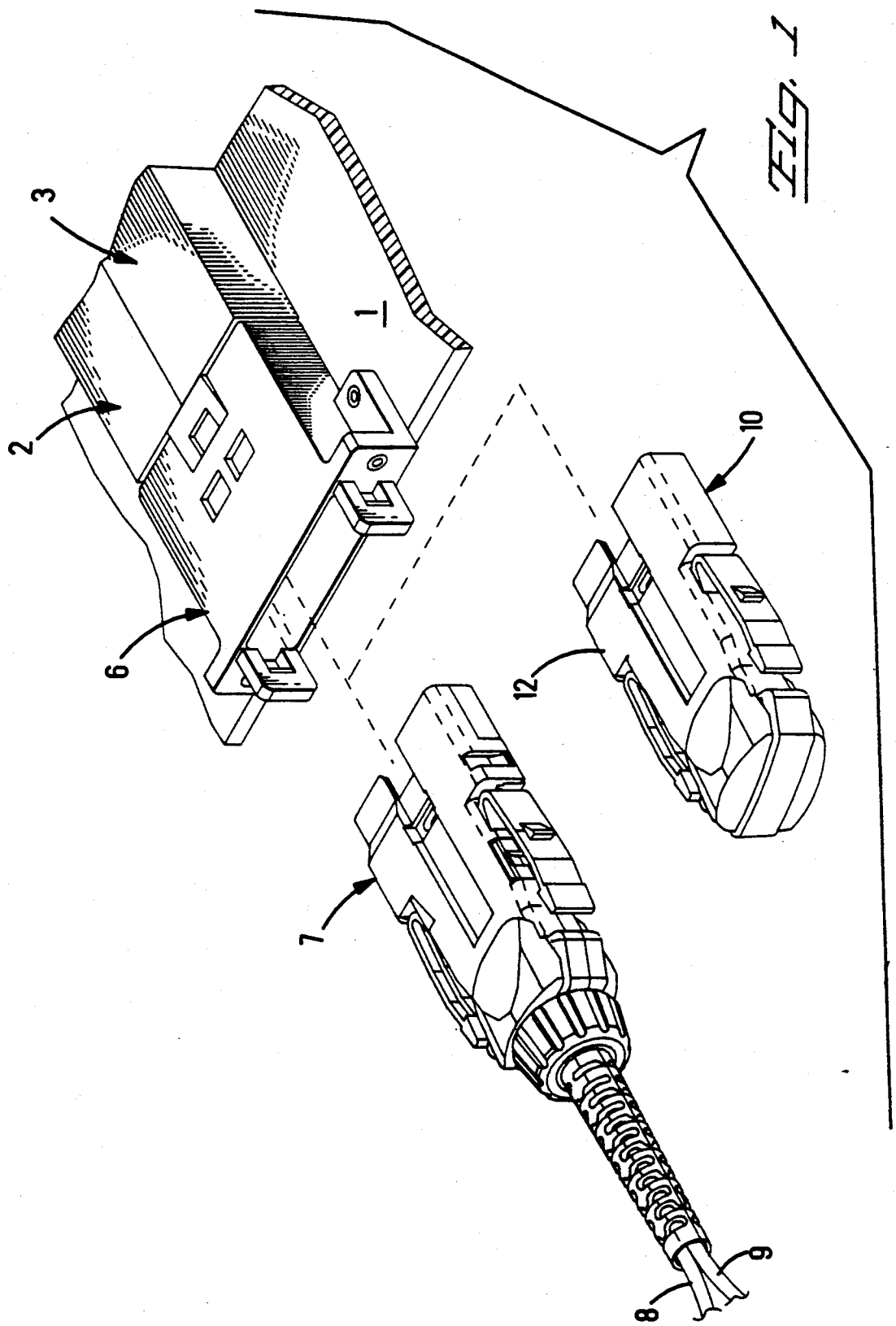

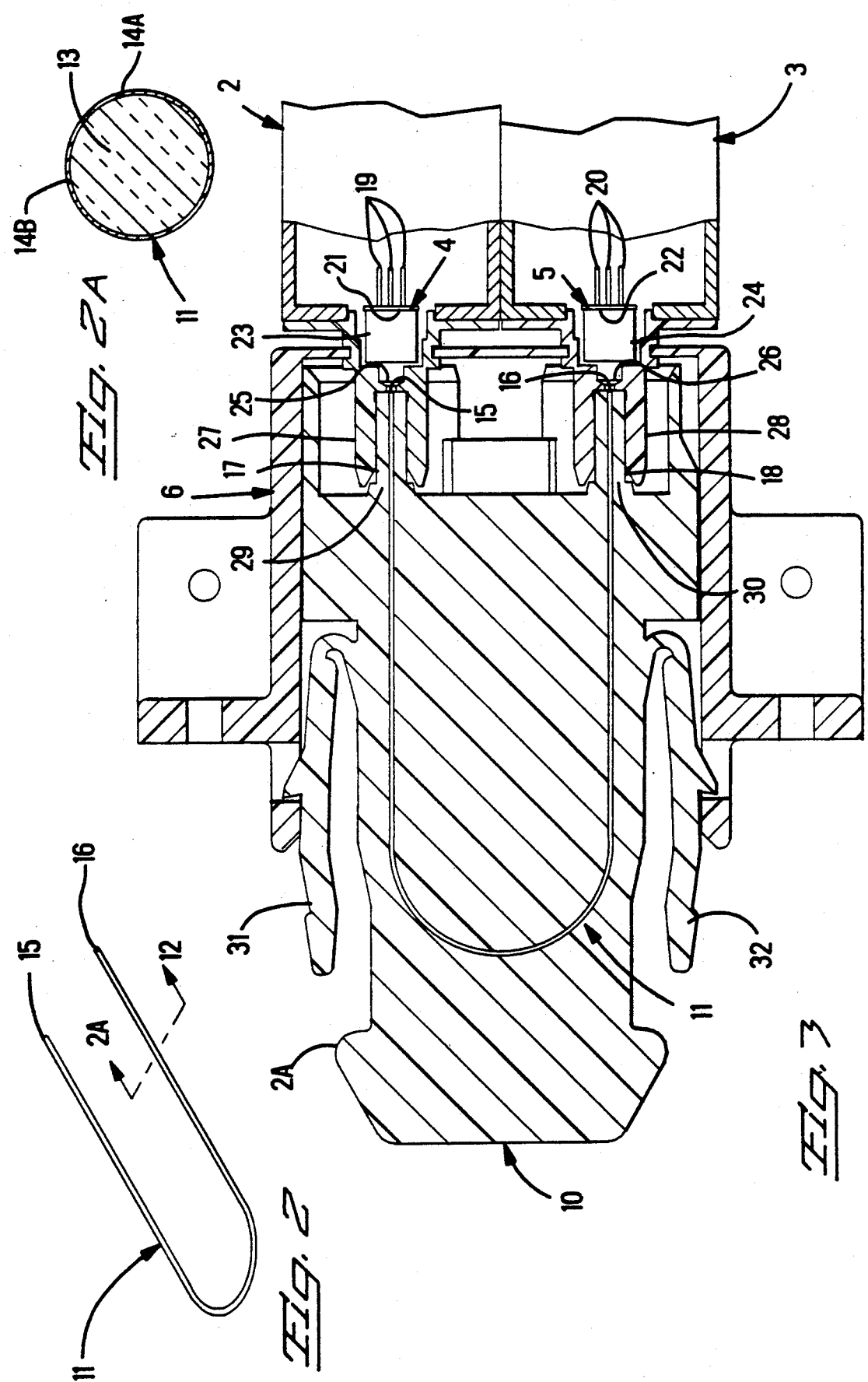

OPTICAL SIMULATOR WITH LOOP-BACK ATTENUATOR HAVING METALIZED OPTICAL FIBER

This application is a divisional of application Ser. No. 07/498,072 filed Mar. 23, 1990, now U.S. Pat. No. 5,039,456.

BACKGROUND OF THE INVENTION

The invention relates to testing optical equipment such as a transceiver, or optical fiber cable, prior to installation in an optical communications system, or for diagnostic testing after installation, and particularly to a simulator for testing such optical equipment.

BACKGROUND OF THE INVENTION

Optical communications systems utilize optical signals to transmit information among various items of optical equipment that are coupled to the systems. The systems utilize optical fiber cables for transmitting the carrier waves from one item of equipment to another. For example, an optical communications system may comprise a computer central processing unit (CPU), a workstation, a peripheral, such as a printer, each of which is equipped with optical transmitting and receiving devices, and optical fiber cables linked among the CPU, the workstation and printer.

Each item of optical equipment is coupled to the optical fiber cables by means of an optical connector to allow a means of disconnecting the equipment from the optical fiber cables. Such systems may utilize two optical fibers, one for receiving optical signals from an item of optical equipment, and another for sending optical signals. Each optical transmitter has an optical emitter for sending the signals, and each optical receiver has an optical detector for receiving the signals.

Testing of such items of optical equipment is a necessity to assure proper design. In testing, the test conditions must accurately simulate the anticipated operating environment.

In operation, systems of optical fiber cables experience attenuation, which is loss of the transmitted optical power. Such systems, utilizing optical fiber cables and other components, are specified in terms of the maximum optical attenuation that can occur between the transmitting and receiving devices, while still providing information transfer with substantially no errors. Typically, testing of such systems is done by simulation whereby the emitter and detector of the item of optical equipment to be tested are connected to a device that simulates the optical system, including its characteristic attenuation, and the operation of the item is tested as though the item were coupled into the system itself and not to the testing device.

First simulators were devices capable of generating special test signals. Testing was performed externally on the item of equipment being tested. Recently, optical equipment has been designed with internal testing capabilities. With self-testing, the expense of specialized testing equipment and associated testing procedures has been substantially reduced. In place of long lengths of cabling to simulate actual operations and in place of simulators that are devices that produce complex signals or measurements, are simplified simulators comprising internal attenuating devices such as the simplified loop-back attenuator. It is anticipated that such simulation will be used primarily as a simplified and inexpensive means of diagnosing and localizing failures in complex systems of installed equipment.

The present invention relates to simulators which are loop-back attenuators, defined as simulators providing a communication signal path that forms a loop from the emitter to a detector of the same item of optical equipment such that optical signals transmitted from the item under test are looped back to the same item and internally transmitted among its component parts. Consequently, communications from a transmitter to a receiver within the unit of equipment can be accomplished without operation of other units of equipment. Functionality of the optical transmitter and receiver, as well as all electronic circuitry used to generate the required optical signals, can be quickly determined. Simulators which are loop-back attenuators purposely simulate a loss of signal intensity expected of a communications system in which the item may be installed for "on-line" operation. Vastagh, U.S. Pat. No. 4,736,100, discloses a known loop-back attenuator involving an optical fiber cable formed in a loop and having ends of the fiber connected with alignment ferrules. The loop is installed in an alignment fixture that aligns the ends of the loop with the emitter and detector of the item to be tested.

This known loop-back attenuator suffers from disadvantages, mainly being incapable of accurately duplicating the amount of attenuation in the operations system so that the testing device creates an environment approximating the operation of the actual system for meaningful test results. Additionally, results can significantly vary from one type of transmitting or receiving device to another since there is no coupling and confinement mechanism similar to that which the optical emission will encounter in actual use.

Objects of the present invention include providing a simulator in the nature of a loop-back attenuator that, in a compact device, is capable of reproducing the total attenuation of a substantially larger cable network. Other objects include providing a device capable of sufficiently attenuating optical power between emitter and detector of a transceiver or the like, to prevent saturation of the detector, and providing a device which easily and accurately may be controllably altered to match the particular amount of attenuation desired to simulate actual environmental operating conditions or to meet manufacturer's standards.

Other problems associated with known attenuators include that they are expensive to manufacture. The optical fiber forming the loop of the attenuator is held in plastic ferrules within alignment fixtures. The alignment fixtures are secured within a molded casing which comprises a molded upper cover and a molded lower cover. The covers snap together to form, along with the encompassed fiber and alignment fixtures, the optical simulators of the prior art. The separate manufacture of each part of the optical simulator and the process of putting the parts together involves expenses that oftentimes result in an article that is too costly to compete in the market. More economical would be a one-step construction process. Another object of the present invention is to provide a simulator in the nature of a loop-back attenuator which may be simply and economically manufactured by a one-step molding process.

In another aspect of this invention, cost is reduced by use of the loop-back attenuators of the present invention in that the fibers utilized in the body of the simulator may be "gang" polished. That is, the ends of the fibers utilized in the present invention may be polished together to prepare the ends for connection to corresponding optical emitters or detectors. This could not be done with previous devices because the fiber ends were too brittle to withstand the rigors of a gang polish and each end had to be separately polished.

These and other objects are achieved by the simulator of the present invention which is a loop-back attenuator molded into a single body along with a metalized fiber formed into the loop-back. The molded body with metalized fiber provides transmitter to receiver optical loop-back having either low loss or some specified insertion loss value. The metalized glass fiber permits robust capturing of the fiber for proper alignment with other terminated fibers or transmitting and emitting devices in that the metalized glass fiber can be directly overmolded in a single-step manufacturing procedure. Included within the loop-back attenuator is a mechanism that will impart attenuation such as core diameter mismatch. Or the metalized fiber may be modified with structures such as filters or films or the like, and so modified to a precise or exact degree so as to provide a precision attenuation.

The optical simulator is shaped to be interchangeable with the complimentary connector that intermates with an optical connector having an optical emitter and an optical detector. The optical simulator comprises an alignment fixture with connectors for intermating with the optical emitter and the optical detector. Further, the simulator includes an optical fiber formed in a loop and installed within the alignment fixture with a first end face of the loop aligned with the emitter. A second end face of the loop is aligned with the detector of the optical connector. The optical simulator comprises a solid molded body of an electrically insulating material. The optical fiber formed in a loop comprises an optical fiber having an initial thin electroless coating of uniform thickness and a further relatively thick electroplated coating of uniform thickness.

The optical simulator is produced by a process comprising depositing a thin, rigid coating of metal by electroless-plating and a relatively thick electroplated coating to an optical fiber. The optical simulator is then formed in a one-step molding process together with the plated optical fiber to produce an alignment fixture with connectors for intermating with an optical emitter and an optical detector. The metalized fiber loop-back is then modified with a mechanism that imparts attenuation such as core diameter mismatch or with structures such as filters or films, or the like, to produce an improved simulator which is sturdy and inexpensively made.

A number of the simulators may be arranged to present a gang of ends of the metalized fibers forming the loop-backs to permit gang polishing without destroying the physical integrity of the glass fiber structure. Additionally, metalization of the fiber permits the fiber to be subjected to a molding process without harming its integrity where heretofore such molding process would destroy the fiber, if not properly prepared, or would involve a substantial amount of cost in preparing the fiber for such molding.

SUMMARY OF THE INVENTION

The invention resides in a simulator in the form of a loop-back attenuator that is constructed for disconnect coupling to an optical connector for bidirectional optical communications. According to the invention, an inexpensive and robust attenuator is provided characterized by a loop-back of metalized optical fiber.

A further aspect of the invention resides in a plug compatible shape for a loop-back attenuator specifically for disconnect coupling to an optical connector of an emitter and detector of an item of optical equipment such as a transceiver mounted on a printed circuit board. The optical simulator of the present invention is a loop-back attenuator shaped to be interchangeable with a complimentary connector that intermates with an optical connector having an optical emitter and an optical detector, the optical simulator comprising connectors for intermating with the optical emitter and the optical detector.

Further, the simulator has an optical fiber formed in a loop and installed within the alignment fixture with a first end face of the loop aligned with the emitter and a second end face of the loop aligned with the detector of the optical connector. The simulator further includes an attenuation inducing means such as core diameter mismatch or as by modification of the face of the loop with an optical film or filter.

The improvement of the present invention resides in the optical fiber formed in a loop comprising an optical fiber having a relatively rigid coating of uniform thickness comprising an inner relatively thin electrolessly plated metal coating and an outer and relatively thick coating of electroplated metal of uniform thickness.

Suitably, the coating comprises a thin electroless coating of uniform thickness. A paper published in Solid State Technology of February 1974 by C. Y. Kuo of the Electro-Metallics Department of Englehard Industries Division of Englehard Minerals & Chemicals Corporation, Neward, J.J., entitled "Electrical Applications of Thin-Films Produced by Metallo-Organic Deposition" discusses advantageous means whereby an initial thin coating may be obtained by electroless plating using the so-called MOD techniques. A fiber of 125 microns diameter may be coated with metal to an outer diameter of 500 microns concentric within one micron with the core.

DESCRIPTION OF THE DRAWINGS

FIG. 1 is a perspective view of the optical simulator adapted for disconnect connection, in place of a complimentary connector for optical fiber cable, with an optical connector mounted on a circuit board together with an optical detector and an optical emitter.

FIG. 2 is a perspective view of the optical fiber of the present invention having a thin rigid coating of metal deposited by electroless-plating and a relatively thick electroplated coating and FIG. 2A is a section view of the same through line 2A—2A.

FIG. 3 is a sectional elevation of the optical simulator showing connection with the emitter and detector of an optical transmitter.

Referring to FIG. 1, is shown a portion of a printed circuit board 1 of a type found internally of an item of optical equipment (not shown) that has an optical transmitter 2 and an optical receiver 3. Also shown is the simulator 10 of the present invention. With reference to FIG. 1 and FIG. 3, an optical emitter 4 of the transmitter 2 and an optical detector 5 of the optical receiver 3 are adjacent each other and are received by a transceiver adapter assembly 6 that is mounted on the circuit board 1 and that is constructed for disconnect coupling with a connector 7 provided with optical fiber cables 8 and 9 that are part of a bidirection communications system, not shown, to which the transmitter 2 and receiver 3 are coupled for bidirection optical communications with other items of the system.

A simulator 10 in the form of a loop-back attenuator 10 is shown in FIG. 3 and is constructed for disconnect coupling with the emitter 4 and detector 5 through the adapter 6 and which simulates the optical attenuation of the system to which the transmitter and receiver are coupled for bidirection communication. Attenuator 10 provides a loop-back optical path providing an optical fiber 11 that receives the optical emission from emitter 4 and guides the optical emission along the loop-back path 11 to the detector 5 for use in testing the operation of the item of optical equipment in which the transmitter 2 and receiver 3 are incorporated. The attenuator 10 comprises a solid body 12 molded with an exterior with dimensions that intermate with adapter 6 to thereby serve as a substitute for the connector 7 associated with the optical fiber cables 8 and 9. In accord with the present invention, the solid body 12 is formed in situ with the optical fiber 11. Referring to FIGS. 2 and 2A, the optical fiber 11 is constructed with core 13 having an initial thin coating of electroless plated metal of uniform thickness 14A and a further relatively thick electroplated coating of uniform thickness 14B. The optical fiber 11 may be metalized by the electroless plating process of C.Y. Kuo, "Electrical Applications of Thin Films by Metallo-Organic Deposition", Solid State Technology, February 1974. The metal plating may be any of known metals suitable for plating, with precious metals such as gold or platinum preferred to impart the protective coating properties necessary to maintaining the integrity of the optical fiber 11 while solid body 12 is overmolded therewith. Preferred is fiber 11 with a thin layer 14A of electroless-plated gold with a relatively thick electroplated coating 14B of nickel.

Body 11 may be formed by known injection molding processes. Suitable electrically insulating materials to form body 11, are ceramics, thermoset polymers and high temperature thermoplastic materials selected from a group consisting of polysulfene, polyetherimide, polyethersulfone, polyphenylene sulfide, and polyetheretherketone.

Further with reference to FIG. 3 is shown optical fiber 11 engaged, in place of the complimentary connector 7, with transceiver adapter assembly 6. Ends 15 and 16 of optical fiber 11 are encapsulated by the molding body to form, at these locations, plugs 17 and 18 which encapsulate the ends of metalized fiber 11 leaving exposed fiber faces 15 and 16.

Transmitter 2 includes leads 19 from the circuitry of the printed circuit board 1, active device 21, such as a light emitting diode (LED), chamber 23, lens or mirror 25, ferrule-shaped mount 27, and mount bore 29. Optical receiver 3 is shown with leads 20 from the printed circuit board active device detector 22, chamber 24, lens or mirror 26, ferrule-shaped mount 28, and mount bore 30. Device mount 27 with through-bore 29 receives plug 17 for mating with accurate alignment of fiber face 15 to the lens or window 23 of emitter 4. Device mount 28 with through-bore 30 receives plug 18 for mating with the accurate alignment of fiber face 16 to lens or window 26 of detector 5. The attenuator body 12 is secured within the adapter assembly 6 by biased spring fit of latch 31 and latch 32 against the inner walls of the adapter assembly 6.

The optical simulator is constructed by first depositing a thin rigid coating 14A of metal by electroless plating and a relatively thick electroplated coating 14B to the optical fiber 11. Thereafter, in the embodiment described herein with reference to FIGS. 1 through 3, the fiber 11 end face 15 which is to be aligned with the emitter 4 is modified with the application of a thin optical film in a thickness of about 3 microns of a multilayer dielectric coating of nickel/chromium alloy. The film is deposited by the procedure described in *Thin Film Optical Filters*, Macleod, McMillan Publishing Co., New York, 1986, at pages 155-157. The fiber is then placed into a mold, and in a one-step process, the optical simulator 10 is formed in situ by a one-shot molding process. The resulting attenuator 10 may be utilized to simulate the operation of optical communication systems via the example of copending application Ser. No. 482,579 filed Feb. 21, 1990, now U.S Pat. No. 4,979,793.

Attenuation for fiber is specified in decibels per kilometer(dB/km). In order to simulate the operation of optical communication systems, most applications require, and most manufacturers specify simulators, which will provide an attenuation in the range of from 12 dB to about 1 dB. Preferably, and for the great majority of applications, the attenuation provided by the present invention for a given wavelength will range between 3 and 10 dB.

We claim:

1. An optical simulator shaped to be interchangeable with a complimentary connector that intermates with an optical connector having an optical emitter and an optical detector, the optical simulator comprising an alignment fixture with connectors for intermating with the optical emitter and the optical detector, and an optical fiber formed in a loop and installed within the alignment fixture with a first end face of the loop aligned with the emitter, and a second end face of the loop aligned with the detector of the optical connector, said simulator further including attenuation inducing means, wherein:
   the optical simulator comprises a solid molded body of an electrically insulating material and;
   the optical fiber formed in a loop comprises an optical fiber having a relatively rigid coating of uniform thickness comprising an inner relatively thin electrolessly plated metal coating and an outer and relatively thick coating of electroplated metal of uniform thickness.

2. The optical simulator of claim 1 wherein the said attenuation inducing means includes modification of an end face of the fiber by application of an optically thin film to provide attenuation of the optical power to the optical detector.

3. The optical simulator of claim 1 wherein the said attenuation inducing means is a core diameter mismatch or numerical aperture mismatch between the end face of the fiber and the detector.

4. The optical simulator of claim 1 wherein the said attenuation inducing means includes an optical filter attached to an end face of the fiber to provide attenuation of optical power to the optical detector.

5. The optical simulator of claim 1 wherein the fiber core is coated with metal to an outer diameter of 500 microns.

6. The optical simulator of claim 1 wherein the optical connector is the adapter assembly of a transceiver.

7. The optical simulator of claim 1 wherein the simulator is a plug-compatible shape for disconnect coupling to the optical connector to a transceiver.

8. The optical simulator of claim 1 wherein the electronically insulating material is selected from the group consisting of ceramics, thermoset polymers and high temperature thermoplastic materials.

9. The optical simulator of claim 8 wherein the thermoplastic materials are selected from a group consisting of polysulfone, polyetherimide, polyethersulfone, polyphenylene sulfide, and polyetheretherketone.

* * * * *